(12) United States Patent
Zaharia et al.

(10) Patent No.: US 12,277,237 B2
(45) Date of Patent: Apr. 15, 2025

(54) MANAGED METASTORAGE

(71) Applicant: Databricks, Inc., San Francisco, CA (US)

(72) Inventors: Matei Zaharia, Palo Alto, CA (US); David Lewis, Salt Lake City, UT (US); Cheng Lian, Alameda, CA (US); Yuchen Huo, San Bruno, CA (US); Ali Ghodsi, Berkeley, CA (US)

(73) Assignee: Databricks, Inc., San Francisco, CA (US)

( * ) Notice: Subject to any disclaimer, the term of this patent is extended or adjusted under 35 U.S.C. 154(b) by 439 days.

(21) Appl. No.: 17/514,982

(22) Filed: Oct. 29, 2021

(65) Prior Publication Data

US 2022/0374532 A1    Nov. 24, 2022

Related U.S. Application Data

(60) Provisional application No. 63/190,591, filed on May 19, 2021.

(51) Int. Cl.
*G06F 21/62* (2013.01)
*G06F 3/06* (2006.01)

(52) U.S. Cl.
CPC ............ *G06F 21/62* (2013.01); *G06F 3/0604* (2013.01); *G06F 3/0655* (2013.01); *G06F 3/0673* (2013.01)

(58) Field of Classification Search
CPC ...... G06F 21/62; G06F 3/0604; G06F 3/0655; G06F 3/0673; G06F 3/0622; G06F 3/0637; G06F 21/6218; G06F 3/067
See application file for complete search history.

(56) References Cited

U.S. PATENT DOCUMENTS

| | | | |
|---|---|---|---|
| 9,594,922 B1* | 3/2017 | McGuire | H04L 9/08 |
| 11,200,331 B1* | 12/2021 | Bouaichi | H04L 9/0897 |
| 2014/0172808 A1* | 6/2014 | Burge | G06F 21/604 |
| | | | 707/694 |
| 2014/0282192 A1* | 9/2014 | Grossman | G06F 16/285 |
| | | | 715/771 |
| 2015/0149441 A1* | 5/2015 | Nica | G06F 16/24542 |
| | | | 707/719 |
| 2016/0034547 A1* | 2/2016 | Lerios | G06F 16/24537 |
| | | | 707/602 |
| 2021/0279365 A1* | 9/2021 | Apsingekar | H04L 63/0442 |

\* cited by examiner

*Primary Examiner* — Carl G Colin
*Assistant Examiner* — Hany S. Gadalla
(74) *Attorney, Agent, or Firm* — Fenwick & West LLP

(57) ABSTRACT

The present application discloses a method, system, and computer system for providing access to information stored on system for data storage. The method includes receiving a data request from a user, determining data corresponding to the data request, determining whether the user has requisite permissions to access the data, and in response to determining that the user has requisite permissions to access the data: determining a manner by which to provide access to the data, wherein the data comprises a filtered subset of stored data, and generating a token based at least in part on the user and the manner by which access to the data is to be provided.

20 Claims, 6 Drawing Sheets

MANAGED METASTORAGE

CROSS REFERENCE TO OTHER APPLICATIONS

This application claims priority to U.S. Provisional Patent Application No. 63/190,591 entitled MANAGED METASTORE filed May 19, 2021 which is incorporated herein by reference for all purposes.

BACKGROUND OF THE INVENTION

A system for big data processing comprises a system for deployments of applications, configurations, one or more datasets, and model(s) used in connection with analyzing the data. Data is often stored in a manner that does not facilitate granular data access control enforcement and coarse-grained controls available to enforce access control are unintuitive and often unfamiliar to most users. For example, data stored in a system for data storage for big data processing is often stored in tables comprising numerous rows and columns. This creates a problem for maintaining data security for data stored in a system for data storage that is accessible to numerous users.

BRIEF DESCRIPTION OF THE DRAWINGS

Various embodiments of the invention are disclosed in the following detailed description and the accompanying drawings.

DETAILED DESCRIPTION

Figure 1:
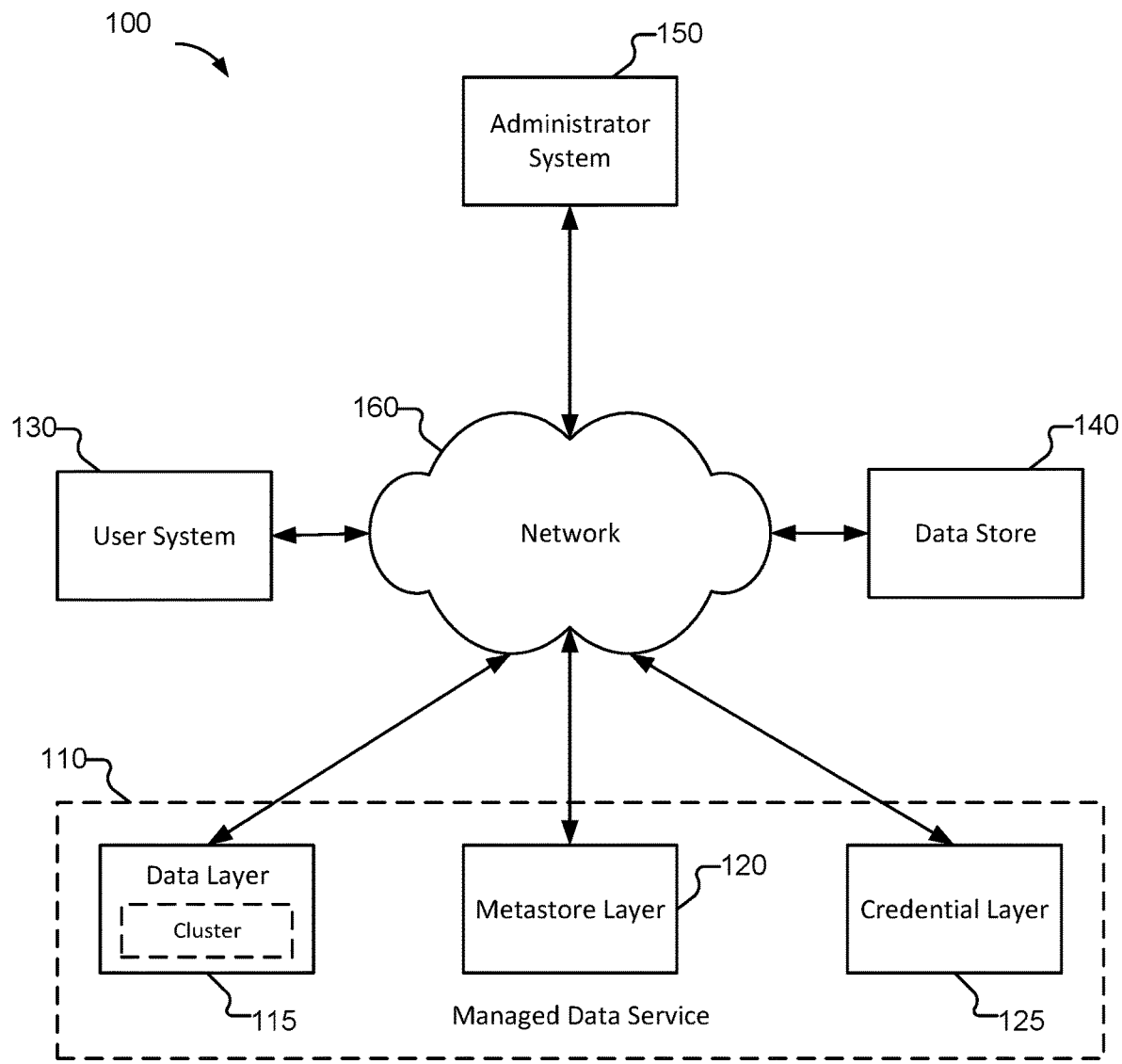
FIG. 1 is a block diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a system for data storage refers to a cloud storage, a blob storage, or other storage system in which data is stored across a plurality of devices such as servers.

As used herein, a cluster refers to a set of connected nodes (e.g., computers, virtual machines, etc.) that work together. As an example, each node runs its own instance of an operating system.

According to various embodiments, a system, method, and/or device for providing access to data stored in a system for data storage is disclosed. The system comprises one or more processors and a memory. The one or more processors are configured to receive a data request from a user, determine data corresponding to the data request, determine whether the user has requisite permissions to access the data, and in response to determining that the user has requisite permissions to access the data: (i) determine a manner by which to provide access to the data, wherein the data comprises a filtered subset of stored data, and (ii) generate a token based at least in part on the user and the manner by which access to the data is to be provided.

In some embodiments, in response to generating the token, the system provides the token and/or a location at which the data is to be accessed (e.g., a location at which the data is accessible such as in connection with use of the token for authentication). For example, the system provides the token and/or the location at which the data is to be accessed to a user system or other system from which the data request is received. The token and/or the location may be comprised in a uniform resource locator (URL) or uniform resource identifier (URI). In some embodiments, in response to receiving the token, the user system can access the data directly (e.g., without further mediation from the metastore at least with respect to such data and/or for such length of time that the token remains valid).

According to various embodiments, the system (e.g., a managed data service, a metastore layer of the managed data service, etc.) determines a manner by which to provide access to the data. In some embodiments, the manner by which to provide access to the data comprises instantiating a cluster and providing access (e.g., a token and location for data on the cluster) to the data on the cluster. For example, the cluster is instantiated and the data is copied to the cluster from the system for data storage. In some embodiments, a cluster comprises a single node cluster. In some embodiments, the manner by which to provide access to the data comprises providing access to a location at which the data is stored on the system for data storage. As an example, the system determines whether to provide access to the data by (i) instantiating a cluster and providing access to the data stored on the cluster, or (ii) providing access to a location at which the data is stored on the system for data storage. For example, the system selects the manner by which to provide access to the data from (i) or (ii) above based at least in part on one or more of (a) a user system from which the data request to access data is received, (b), a user associated with the data request, (c) a type of data requested, (d) a context of the data request, (e) a determination that the user system from which the data request is received is not a managed or protected user system (e.g., that the user system is not a privilege-enforcing client), (f) an amount of memory that a user associated with a data request has permission to access, (g) an indication in the data request of the manner by which the data is to be accessed (e.g., via a secure cluster, or to system for data storage), etc. Examples of the context of the data request include a date, a time, a geographic region of the data (e.g., a data location), a location of the user system, a group membership, a quality associated with a user, applications being executed contemporaneous with the data request (e.g., executed on a server of the system, by the user system, etc.), other requests or other data obtained by the corresponding user or user system within a predetermined threshold period of time, etc.

Various embodiments include a protocol for enforcing fine grained data access permissions to untrusted applications running over a system for data storage (e.g., a managed storage system), where the access service (e.g., the managed data service) grants scoped access tokens understood by the underlying system (e.g., S3 pre-signed URLs, Amazon Web Services Security Token Service tokens, Azure Shared Access Signature tokens, etc.) to each application to give the application access only to the data the application needs. When the data granularity required is smaller than one file, the access service automatically filters down the file and possibly caches this result to give the filtered result (e.g., a filtered subset of stored data) to the applications. The filtering of the data allows trusted or untrusted applications running on behalf of a user to access just that user's data efficiently without being granted access to the whole underlying storage system (e.g., the system for data storage) and without requiring all the data to be streamed through a filtering service.

In some embodiments, the system determines to not provide a user (or user system or application running on the system) with access to the location at which the data is stored on the system for data storage (e.g., restrict access of data stored at the system for data storage) in response to determining that the user system from which the data request is received is a privilege-enforcing client. As an example, a privilege-enforcing client may be a device that is managed by an organization (e.g., a customer that owns the data stored on the system for data storage) such as in a manner that enforces one or more security policies for the organization or for particular types of information. A device that is managed may include a device that is subject to an organization's deployment of a unified endpoint and enterprise mobility management for mobile devices. According to various embodiments, in response to determining that the system from which the data request is received is not a privilege-enforcing client, the system determines to provide access to the data via instantiating a cluster, copying the data to the cluster, and providing access to the data stored on the cluster. In some embodiments, in response to determining that the user system corresponds to a device that is privilege-enforcing, the system determines to provide the user system with access to a location at which the data is stored on the system for data storage. For example, with respect to a privilege-enforcing device, the system deems the device able to perform a data transformation to provide a user with only such data that the user has authorization to access (e.g., the privilege-enforcing device locally enforces one or more security policies such as with respect to data of the organization). In some embodiments, with respect to non-privilege-enforcing devices (e.g., user systems), the system determines (e.g., computes) a set of data that the user associated with the user system should be able to access/view (e.g., the data that the user has privileges to access, the data that is available for access from a non-privilege-enforcing device, etc.), and access to such data is provided. As an example, the system determines the set of data that the user should be able to access contemporaneously with a data request to access data. If the system (e.g., managed data service) determines that the user (or application or user system) is not to be provided with access to an entire dataset or directory, the system may determine to provide access to certain data (e.g., a filtered subset of stored data) via instantiating a cluster, copying the certain data to the cluster, and providing access to the certain data stored on the cluster. According to various embodiments, in response to determining to provide the user with access to data via an instantiation of a cluster storing the data, the system (e.g., the managed data service, or a metastore layer of the managed data service) determines the data for which the user is authorized to access and/or the data that is responsive to the data request, and the system instantiates the cluster, and the system creates on the cluster a table with the data for which the user is authorized to access and/or the data that is responsive to the data request. The system can create a table on the cluster based on invoking the system for data storage to create a table with certain data. As an example, the system identifies a location at which to create the table (or receives a location at which the cluster determined to create the table), causes the system for data storage to create the table, generates a token (e.g., a temporary token) to access the data at the location at which the table resides on the system for data storage, and provides to the user system the token and a path to the location.

In some embodiments, the certain data is stored in a new structure, file, table, or as values on the distributed storage system and access is provided to the certain data. In some embodiments, the system for data storage comprises a distributed data storage system.

In some embodiments, the system determines to provide a user (or user system or application running on the system) with access to the location at which the data is stored on the system for data storage (e.g., restrict access of data stored at the system for data storage) based at least in part on a user that communicated the data request. For example, the system determines whether to provide access to the location at which the data is stored on the system for data storage based on a level of permission that the user has with respect the data (e.g., the data subject to the request). The level of permission that a user has with respect to the data may be set by a user having administrator privileges or a user otherwise having privileges to grant access rights to other users. In response to determining that the user system from which the data request is received is privilege-enforcing client, the system may determine to provide access to a location at which the data is stored on the system for data storage. For example, providing access to a location at which the data is stored on the system for data storage comprises using the system for data storage to filter the data according to (i) data responsive to the data request, and (ii) permissions of the user or application requesting such data. According to various embodiments, in response to determining to provide the user with access to the location at which the data is stored on the system for data storage, the system (e.g., the managed data service, or a metastore layer of the managed data service) determines the data for which the user is authorized to access and/or the data that is responsive to the data request, and the system creates a table on the system for data storage corresponding to the data for which the user is authorized to access and/or the data that is responsive to the data request. The system can create a table on the system for data storage based on invoking the system for data storage to create a table with certain data. As an example, the system identifies a location at which to create the table, causes the system for data storage to create the table, generates a token to access the data at the location at which the table resides on the system for data storage, and provides to the user system the token and a path to the location.

According to various embodiments, data stored on the system for data storage (e.g., data that may be subject to a data request to access such data) includes tables, views, machine learning models, machine learning tracking data, features (e.g., features used in determining, training, executing models), information pertaining to features, developer workspace documents or information such as notebook and projects, dashboards, billing information, audit logs, information scheme of a table catalog, lineage and metadata information, secrets, information pertaining to management of secrets, information pertaining to mount the configuration of a distributed file system mounted to a system for data storage (e.g., mount points for the distributed file system, etc.), etc. Various other types of data can be stored on the system for data storage. In some embodiments, data stored on the system for data storage comprises tables within a root store on the system for data storage, and/or external tables that reside outside the root store.

According to various embodiments, access controls can be configured (and applied to) various types of information such as protected health information and personal identifiable information. The access controls for various types of information can be applied to (and enforced with respect to) various data comprising such information, such as files, columns in tables, etc. According to various embodiments, the data security controls are more granular. For example, in contrast to related art systems that comprise coarse-grained controls such as enforcing access to rows of data in a table, data security control according to various embodiments enables finer control such as a cell-level control, a row-level control, a column-level control, or a type of information-level of control. In some embodiments, security is enforced at a column level, at an attribute level, on a basis of an environment from which data is being accessed, etc. As an example, if security is enforced with respect to a column, to prevent a user from accessing data in other columns in a table, the system creates a new table comprising only the columns that the user is permitted to access. The new table can be further filtered to comprise only data that is responsive to the data request (e.g., to eliminate non-responsive columns or rows, etc.). As an example, if security is enforced with respect to an attribute, to prevent a user from accessing data having a specific attribute, the system creates a new table comprising the original table filtered to remove data having the specific attribute. For example, if a user is on a finance team and the finance team does not have permission to see personal information within the organization or a particular table, the system (e.g., the metastore) instructs the data store to only permit the user to access columns that do not have an associated attribute (e.g., the metastore can instruct the data store to create a new table with personal information filtered out, such as a new table corresponding to an initial table filtered to remove columns having the associated attribute such as an associated personal information attribute). Similarly, the system (e.g., the metastore) instructs causes a cluster to only permit the user to access columns that do not have an associated attribute such as by causing the cluster to filter out columns having an associated attribute or by only copying to the cluster only information that does not have the associated attribute (e.g., when instantiating a cluster in connection with providing data responsive to a data request).

According to various embodiments, the token (e.g., the credential provided in connection with the location at which the data is to be accessed) is generated to be time-limited, geographically limited, or any other appropriate limitation. For example, the token is temporarily valid for a predefined period of time. Upon expiration of the token, authentication of the token in connection with an attempt to access the data will be denied. In some embodiments, the managed data service of the system enforces the access to data stored on the system for data storage. For example, a metastore layer comprised in the managed data service determines a scope of data to which to provide access to the user. The scope of data to which to provide access to the user can correspond to a set of data for which the user (or user system or application) has permission to access. As another example, the scope of data to which to provide access to the user corresponds to a set of data (i) for which the user (or user system or application) has permission to access, and (ii) that is responsive to the data request. In response to the determination that the system is to provide access to the data via instantiating a cluster and providing access to the data stored on the cluster, the system generates a token to access the data at the location on the cluster (or a token to the cluster generally, etc.). In response to the determination that the system is to provide access to the data via providing access to a location at which the data is stored on the system for data storage, the system generates a token to access the data stored on the system for data storage (e.g., a token to access corresponding customer data stored on the system for data storage generally, a token for a table created on the system for data storage with data responsive to the data request, etc.).

An example of a process for providing data includes (1) a first user creates a view V (e.g., a view of a table of data, such as a subset of data within the table) which transforms data selected from table T, and the first user grants a second user to select from view V (e.g., to access data comprised in view V). (2) a second user sends a data request to the system to request access to data in view V (e.g., to read from view V). For example, the second user sends a request via an application program interface (API) that interfaces with an application on the system such as on a managed data service. As another example, the second user sends the data request to a business intelligence layer (or application running thereon), and managed data service (or a metastore layer of the managed data service) intercepts the data request and mediates the request for data between the second user and the system for data storage. (3) the system (e.g., the managed data service) determines that the request is from an external source (e.g., a non-privilege-enforcing device), and in response to such a determination, the system instantiates a cluster (e.g., or first determines whether a cluster has already been instantiated with data responsive to the data request), copies/writes the transformed data corresponding to view V to the cluster, and provides to the second user (e.g., the corresponding user system) a temporary credential (e.g., a token generated by the managed data service such as a token that remains valid for a predetermined amount of time, etc.) and a storage path to the transformed data on the cluster. (4) the second user reads the data from the storage path on the cluster. In some embodiments, the system decommissions the cluster after a predefined threshold period of time, after a threshold period of time has elapsed without a threshold number of data accesses or incoming requests, in response to a triggering event, in response to a cost analysis determination (e.g., a determination to decommission in response to a cost being higher for keeping the data around to read vs. reloading the data at a later time when requested again), based on a user settable value (e.g., a value indicating a user rating of importance for the data to be accessible), based on a past history of access frequency, based on a cost saving function, or based on any other appropriate manner of determining de-provisioning a cluster.

According to various embodiments, the system (e.g., the managed data service) logs an association among (i) use of a token, (ii) data that is exposed to a user or application in connection with the use of the token, and (iii) the user or application for which the token was used. Accordingly, the system can monitor/track data leaks or data views on a much more granular level than related art. For example, in related art systems, a token was issued from a database-controlled access service, and the related art database systems generally was not able to assess whether certain data should have been visible or not for a particular user (e.g., a related art database system does not provide access controls on a column-by-column basis for a table; rather related art systems provide data on a row-by-row basis).

An example of a process for providing data includes: (1) a first user sends a request to the system (e.g., the managed data service) to grant a second user access (e.g., to read) a table; (2) the system determines whether the first user has the requisite permission to grant the second user such permission to access the table; (3) in response to determining that the first user has the requisite permission to grant the second user such permission, the system (e.g., the managed data service, or the metastore layer of the managed data service) logs the permission such as writing the permission to an internal database; (4) second user sends a data request to the system to request access to data in view V (e.g., to read from view V)—for example, the second user sends a request via an application program interface (API) that interfaces with an application on the system such as on a managed data service; as another example, the second user sends the data request to a business intelligence layer (or application running thereon), and managed data service (or a metastore layer of the managed data service) intercepts the data request and mediates the request for data between the second user and the system for data storage; (5) the system (e.g., the managed data service) determines that the second user has the appropriate/requisite permissions to access (e.g., to read) the table; (6) in response to determining that the second user has the appropriate permissions to access the table, the system (e.g., the managed data service, or the metastore layer of the managed data service) creates a temporary credential (e.g., a token generated by the managed data service such as a token that remains valid for a predetermined amount of time, etc.) and a storage path to the table on the system for data storage; and (7) the second user reads the data from the table on the system for data storage. However, because the second user was granted a permission to read the table, the second user cannot modify data comprised in the table. In some embodiments, in this case, the user has permission to read the table and queries the metadata store, the metadata store sees that the user has permission to read the data in the metastore and responds with where to read the data from and the credentials to read the data. In some embodiments, in other cases, the user has partial access and the system provides access by writing the data out to an alternate location before giving the user access to that temp path to that alternate location.

According to various embodiments, a managed data service mediates access to a system for data storage. In some embodiments, a metastore layer intercepts a data request sent to the system for data storage. In some embodiments, a control layer intercepts a data request sent to the system for data storage, and the control layer provides or forwards the data request to the metastore layer for the metastore to mediate access to the system for data storage. In response to intercepting a data request, the metastore layer determines whether the user from which the data request originated has requisite permission to access the data corresponding to the data request (e.g., whether the user has access to the system for data storage or part thereof). In response to receiving a token from the metastore to access the data corresponding to the data request, the user can communicate with the system for data storage directly and use the token to access the corresponding data. For example, communicating with the system for data storage directly can correspond to communicating with the system for data storage without further mediation by the metastore (e.g., at least while the token being used is still valid).

In some embodiments, the system determines to not provide a user (or user system or application running on the system) with access to the location at which the data is stored on the system for data storage (e.g., restrict access of data stored at the system for data storage) in response to determining that an amount of data for which the user does not have access (e.g., the amount of data that the user is authorized to read based on the permissions policy). In some embodiments, in the event that the user is not provided with access to data, an indication is provided to the user (e.g., permission is denied to access the data). In response to determining amount of data user has access to exceeds a memory threshold, the system (e.g., the managed data service, or metastore layer of the managed data service) determines to provide the user with access to the data via instantiating a cluster and providing access to the data stored on the cluster. For example, the system causes the following data to be copied to the cluster: (i) data that the user is authorized to read, or (ii) data that the user is authorized to read and that is responsive to the data request. As an example, the system causes the cluster to create a table that comprises data that the user is authorized to read and that is responsive to the data request, and determines a location of the table. As an example, the system identifies a location at which to create the table (or receives a location at which the cluster determined to create the table), causes the system for data storage to create the table, generates a token (e.g., a temporary token) to access the data at the location at which the table resides on the system for data storage, and provides to the user system the token and a path to the location.

The system improves the security of data stored in system for data storages by enabling greater control with respect enforcing data access permissions. The system provides greater granularity of security enforcement. As an example, in contrast to related art systems, which merely provide enforcement of data access permissions on an entire dataset, or row of a dataset, systems according to various embodiments enable enforcement of data access permissions on a particular data item such as by enforcing security on a column-by-column basis or enforcing permissions on both a row and a column in conjunction. The system further improves security by providing access to certain data in a secure cluster such as a cluster that is instantiated specifically in response to a data request and to which filtered data is copied. As an example, the filtered data copied to the instantiated cluster may be selected to be only data accessible by (e.g., authorized for) the user.

In some embodiments, the system improves the computer by enabling single path access to data stored in multiple diverse types of storage systems to systems using cluster computing resources. In some embodiments, fine grained security for data is enabled for the data accessed regardless of whether the storage systems natively support this type of security. The system intermediates data access by determining the capabilities of the systems and then either providing appropriate credentials for accessing (e.g., user credentials, session credentials, storage system credentials, etc.) data in a fine grained access system or obtaining, filtering, and storing by generating a separate data structure to access that only includes data allowed to be accessed (e.g., based on the user, session, storage system, etc.) as well as a accessing mechanism (e.g., a URL, a URI, or other pointer). This makes access more efficient and more secure for users and for system providers and enables use of existing storage resources.

FIG. 1 is a block a diagram of a network system according to various embodiments of the present application.

In the example illustrated in FIG. 1, system 100 includes managed data service 110, user system 130, data store 140, and/or administrator system 150. In some embodiments, managed data service 110 and/or data store 140 are integrated (e.g., combined into a layer or a single set of server(s)). In some embodiments, managed data service 110 comprises data layer 115, metastore layer 120, and/or credential layer 125. In some embodiments, data layer 115 comprises a cluster (e.g., a cluster that managed data store instantiates). In some embodiments, data layer instantiates a cluster on one or more servers outside managed data service 110. System 100 further includes one or more networks such as network 160 over which user system 130 and/or administrator system 150 communicates with managed data service 110 and/or data store 140. In various embodiments, network 180 includes one or more of a wired network, and/or a wireless network such as a cellular network, a wireless local area network (WLAN), or any other appropriate network. In some embodiments, data layer 115, metastore layer 120, and/or credential layer 125 are respectively implemented by one or more servers. System 100 may include various other systems or devices.

According to various embodiments, data store 140 is a system for data storage. For example, data store 140 is a blob storage. In some embodiments, data store 140 comprises data for a plurality of customers of managed data service 110 (e.g., different organizations or tenants registered with managed data service 110). As an example, the data for the plurality of customers is not physically divided or segregated. For example, data among the plurality of customers is segregated (e.g., the data is segmented using customer storage buckets respectively associated with a particular customer). In some embodiments, data stored in data store 140 is encrypted such as by using a token associated with a particular customer.

According to various embodiments, system 100 comprises managed data service 110. In some embodiments, managed data service 110 manages access to data stored in data store 140 and/or providing such data to a user system 130 in a secure manner (e.g., in a manner that enforces one or more security policies). In some embodiments, access to data in the data store 140 is mediated by metastore layer 120 of managed data service 110. For example, metastore layer obtains a temporary token in connection with a data request from user system 130, and user system 130 uses the temporary token in connection with accessing data stored in data store 140 or an instantiated cluster (e.g., depending on permissions of the token and the path for the location of the data provided by metastore layer 120). In some embodiments, after receiving the temporary token for the data corresponding to a data request, user system 130 can thereafter directly access data stored in the data store 140 (e.g., subsequent accesses are not mediated via metastore layer 120 at least until the temporary token has expired). As an example, subsequent data requests to access the data corresponding to the temporary token can be mediated by a control layer (not shown) of a service such as file system service that indexes data stored in data store 140.

Metastore layer 120 mediates a data request for data stored in data store 140. In some embodiments, metastore layer 120 stores metadata pertaining to data (e.g., files) stored on data store 140. As an example, metastore layer 120 stores an index of files to file locations. Metastore layer 120 determines a manner by which a manner by which to provide access to the stored data in data store 140. In response to determining the manner by which to provide access to the data, metastore layer 120 causes the data to be provided to the user in such a manner (e.g., creates on data store 140 a table corresponding to a data request, instantiates a secure cluster in which to provide data, etc.) and provides the user with a location (e.g., path, URL, URI, etc.) at which the data can be accessed (e.g., a location of a table in data store 140, a location of an instantiated cluster, a location of a table on an instantiated cluster, etc.). In some embodiments, metastore layer 120 obtains (e.g., generates, requests, etc.) a token to provide to the user (e.g., user system 130) for accessing data.

In connection with mediating a data request, metastore layer 120 determines whether a user (e.g., a user associated with the data request) or application is authorized to access such data (e.g., that the user has requisite permissions to access the data). For example, metastore layer 120 stores (or has access to) a mapping of permissions such as a mapping of user identifiers for permitted users to data, a mapping of user identifiers for permitted users to types of data, a mapping of user identifiers for permitted users to locations of data (e.g., directories, tables, views, tenants, etc.), a mapping of groups of users to data, etc. Metastore layer 120 can use a user identifier associated with a data request (e.g., included in the data request) to query the mapping of permissions in connection with determining whether the user is authorized to access the data corresponding to the data request. If the user or application is authorized to access such data, metastore layer 120 determines an extent of such authorization (e.g., read, write, modify, delete, create, etc.). In response to determining that the user is authorized to access the data stored on data store 140, metastore layer 120 determines the manner by which to provide access to the data.

In some embodiments, metastore layer 120 generates or obtains a credential (e.g., a temporary token) with which a user is to access data corresponding to a data request. For example, managed data service 110 can comprise credential layer 125, and metastore layer 120 obtains the token from credential layer 125. As an example, in response to determining to provide the user with access to the data corresponding to a data request (e.g., and determining a path of a location at which the data is stored), metastore layer 120 sends a request to credential layer 125 for a credential to be generated for the user to use such credential to access the data at the location. The request for the credential can comprise one or more of an indication of a user (or set of users) to be associated with the credential (e.g., the user that is to use the credential to access the data), an indication of the location of the data for which the credential is to be used to access, an expiry date, and/or an invalidating condition (e.g., a number of uses for which the credential is valid), etc. In some embodiments, in response to obtaining or generating the credential, metastore layer 120 provides the credential to the user (e.g., user system 130) such as in connection with the location at which the user is to access the data.

According to various embodiments, managed data store service 110 comprises credential layer 125. In response to credential layer 125 receiving a request from metastore layer 120 for a credential (e.g., a temporary token), credential layer 125 generates and provides the credential to metastore layer 120 (e.g., which in turn provides the credential to user system 130, etc.). As an example, credential layer 125 generates the credential based at least in part on one or more of an indication of a user (or set of users) to be associated with the credential (e.g., the user that is to use the credential to access the data), an indication of the location of the data for which the credential is to be used to access, an expiry date, and/or an invalidating condition (e.g., a number of uses for which the credential is valid), etc.

In some embodiments, metastore layer 120 stores a mapping of files to a hierarchical structure. For example, metastore layer 120 transforms the non-hierarchical manner by which data is stored in data store 140 to a hierarchical structure corresponding to a customer. In some embodiments, data store 140 comprises one or more datasets associated with a customer. For example, data store 140 stores files and data against which code (e.g., code being developed via a web interface at credential layer 125 via user system 130) is run against such as in connection with testing the code.

According to various embodiments, managed data service 110 comprises data layer 115. According to various embodiments, data layer 115 comprises a cluster (e.g., a cluster of machines such as virtual machines). As an example, the cluster comprises at least one master node and one or more worker nodes. Managed data service 110 can copy at least a subset of information from data store 140 to data layer 115 (e.g., a cluster instantiated on data layer 115). For example, in response to determining that data corresponding to a data request is to be provided to a user, metastore layer 120 determines to provide the data via instantiating a cluster and providing access to the data stored on the cluster. In response to determining to provide the data via instantiating a cluster and providing access to the data stored on the cluster, metastore layer 120 causes a cluster to be instantiated such as on data layer 115 and copies the applicable data from data store 140 to the instantiated cluster. In some embodiments, the applicable data copied to the instantiated cluster corresponds to data (i) for which the user (or user system or application) has permission to access, and/or (ii) that is responsive to the data request. Metastore layer 120 obtains the location at which the cluster is instantiated and/or location at which the data is located on the instantiated cluster, and provides the corresponding location to the user. In some embodiments, in response to determining that the cluster has been instantiated, metastore layer 120 causes (e.g., instructs) the cluster to create a table comprising data that is responsive to the data request, and metastore layer 120 obtains a location of such table and provides the location of the table to the user. In some embodiments, data layer 115 maintains the cluster for a predetermined time or until a termination condition is satisfied. Examples of a termination condition include: (a) a user indicating that the data and/or cluster is no longer needed, (b) a number of data accesses to the cluster is less than a predefined access threshold within a predefined threshold period of time, (c) metastore layer 120 providing an instruction to terminate the cluster, (d) expiration of a predefined period of time, (e) receipt of an indication from data store 140 or metastore layer 120 that information copied to the cluster has changed at the data store 140, etc. Various other termination conditions can be implemented.

According to various embodiments, system 100 comprises user system 130. User system 130 is used by a user (e.g., a developer such as a developer of code, a developer of a model, a user of an organization associated with a one or more datasets stored at data store 140, etc.) to communicate with managed data service 120 (e.g., metastore layer 120, a cluster instantiated on data layer 115, etc.) and/or data stored in data store 140. As an example, user system 130 communicates with managed data service 110 via a web-interface. In some embodiments, a user uses user system 130 to develop code on a business application layer, which makes a call to managed data service or to data store 140 (e.g., such call being intercepted by metastore layer 120 or a control layer that provides the call to metastore layer 120), to modify code at a business application (e.g., to execute code against data stored in data store 140), to query data store 140 (e.g., in connection with discovering code, a library, a module, etc.), etc.

According to various embodiments, system 100 comprises an administrator system 150 for use by an administrator such as an administrator of managed data service 110 or an administrator of a customer associated with an instance or tenant being deployed by data layer 115 and/or data store 140. For example, administrator system 150 comprises a system for communication, data access, computation, etc. An administrator uses administrator system 150 to maintain data store 140 (e.g. maintain raw data comprised in data store 140), to define and manage applications provided by system 100, etc. For example, an administrator uses administrator system 150 to define one or more security policies that are to be enforced (e.g., by metastore layer 120) with respect to a data stored at data store 140. Administrator system 150 communicates with managed data service 110 via a web-interface (e.g., by using a web browser, etc.). For example, administrator system 150 communicates with managed data service 110 via a web-browser installed on administrator system 150. As another example, administrator system 150 communicates with managed data service 110 via an application running on administrator system 150.

Figure 2:
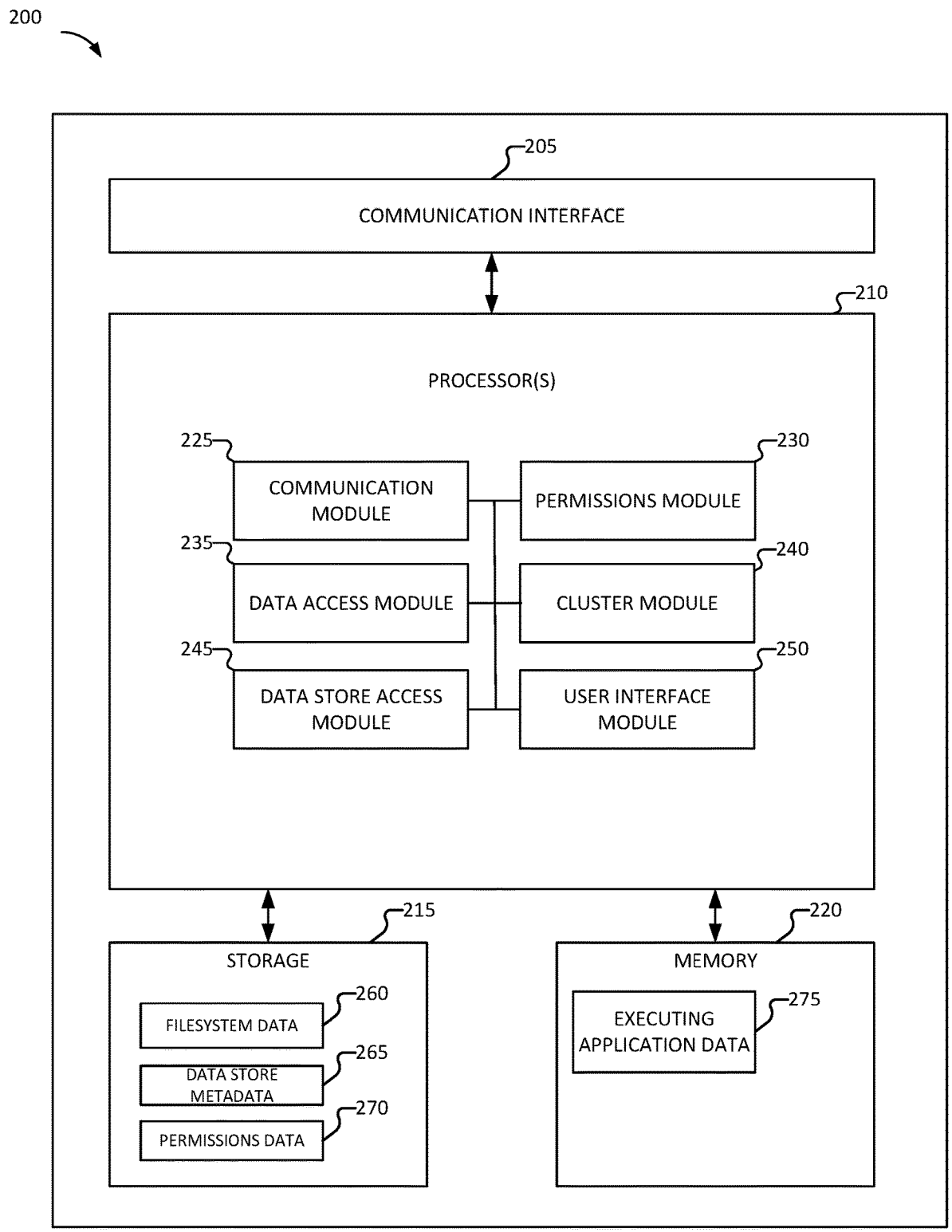
FIG. 2 is a block diagram of a managed data service system according to various embodiments of the present application.

FIG. 2 is a block diagram of a managed data service system according to various embodiments of the present application. According to various embodiments, system 200 is implemented at least in part by system 100 of FIG. 1. In some embodiments, system 200 implements at least part of process 300 of FIG. 3, process 400 of FIG. 4, process 500 of FIG. 5, and/or process 600 of FIG. 6.

In the example shown, system 200 implements one or more modules in connection with mediating data access for data stored at a system for data storage (e.g., a data store), enforcing security or data access policies with respect to such data, determining a manner by which the data is to be provided to a user, etc. System 200 comprises communication interface 205, one or more processors 210, storage 215, and/or memory 220. One or more processors 210 comprises one or more of communication module 225, permissions module 230, data access module 235, cluster module 240, data store access module 245, and/or user interface module 250.

In some embodiments, system 200 comprises communication module 225. System 200 uses communication module 225 to communicate with various other systems such as a user system, an administrator system, and/or a data store (e.g., a system for data storage). For example, communication module 225 provides to communication interface 205 information that is to be communicated. As another example, communication interface 205 provides to communication module 225 information received by system 200. Communication module 225 is configured to receive user input to a user system such as a data request for data stored in a data store, a request to access, or provide a user with results. The user input to the user system can include the creation of a new file, a modification or update to a file, a query for a file (e.g., a csv file, a library, a module, etc.), a request to set one or more security policies (e.g., a permission with respect to accessing a file or a directory), etc. For example, the user develops or requests execution of code in a workspace provided by a user system. Communication module 225 is configured to provide to various user systems information such as user interface (e.g., an interface corresponding to a workspace or notebook), information that is responsive to one or more queries or tasks requested to be executed, locations at which data is to be accessed, credentials for accessing data, etc.

In some embodiments, system 200 comprises permissions module 230. System 200 uses permissions module 230 to manage and/or enforce permissions such as permissions with respect to data stored at a data store, or data stored on an instantiated cluster (e.g., a cluster instantiated with respect to managed data service). In some embodiments, permission module 230 stores mapping of permissions. Examples of permissions can include a mapping of user identifiers for permitted users to data, a mapping of user identifiers for permitted users to types of data, a mapping of user identifiers for permitted users to locations of data (e.g., directories, tables, views, tenants, etc.), a mapping of groups to data. In response to system 200 receiving a data request to access data, permissions module 230 determines whether the user associated with the data request has requisite permissions to access the data corresponding to the data request, data on the data store, data on the instantiated cluster, etc. For example, permissions module 230 performs a lookup or query to determine whether the data has requisite permissions.

In some embodiments, system 200 comprises data access module 235. System 200 uses data access module 235 to determine a location at which data is stored on a data store, determine a manner by which the access to the data is to be provided to a user, and to determine a location at which system 200 provides access to the data. Data access module 235 can provide a location at which data is stored to permissions module 230 in connection with permissions module 230 determining whether a user has permission to access such data. In some response to system 200 determining that the user has permission to access the data, data access module 235 determines the manner by which system 200 is to provide access to the data. In some embodiments, the manner by which access is provided to the data comprises instantiating a cluster and providing access (e.g., a token and location for data on the cluster) to the data on the cluster. For example, the cluster is instantiated and the data is copied to the cluster from the system for data storage. In some embodiments, the manner by which to provide access to the data comprises providing access to a location at which the data is stored on the system for data storage. As an example, data access module 235 determines whether to provide access to the data by (i) instantiating a cluster and providing access to the data stored on the cluster, or (ii) providing access to a location at which the data is stored on the system for data storage. For example, data access module 235 selects the manner by which to provide access to the data from (i) or (ii) above based at least in part on one or more of (a) a user system from which the data request to access data is received, (b), a user associated with the data request, (c) a type of data requested, (d) a context of the data request, (e) a determination that the user system from which the data request is received is not a managed or protected user system (e.g., that the user system is not a privilege-enforcing client), (f) an amount of memory that a user associated with a data request has permission to access, (g) an indication in the data request of the manner by which the data is to be accessed (e.g., via a secure cluster, or to system for data storage), etc. Examples of the context of the data request include a date, a time, a geographic region of the data (e.g., a data location), a location of the user system, a group membership, a quality associated with a user, applications being executed contemporaneous with the data request (e.g., executed on a server of the system, by the user system, etc.), other requests or other data obtained by the corresponding user or user system within a predetermined threshold period of time, etc.

According to various embodiments, data access module 235 obtains a location at which the data is to be accessed and a credential to be used in connection with accessing the data. As an example, data access module 235 obtains the location at which the data is to be accessed from cluster module 240 and/or data store access module 245. For example, in response to determining that the data is to be provided via instantiating a cluster, data access module 235 obtains (e.g., receives from the cluster module 240, determines and instructs the cluster module, etc.) a location on the cluster at which the data (e.g., the data responsive to the data request) is to be accessed. As another example, in response to determining to provide access to the data at a location on the data store, data access module 235 determines a location on the data store at which the data is to be accessed (e.g., data access module 235 causes data store access module 245 to create a table comprising data responsive to the data request, etc.). Data access module 235 provides the location at which the data is to be accessed (e.g., a location on a cluster, a location on the data store, etc.) to a user such as to a user system in response to the data request. As an example, data access module 235 provides the location at which the data is to be accessed to the user system via user interface module 250 and/or data access module 235.

In some embodiments, in connection with providing the location at which the data is to be accessed, data access module 235 provides to the user a credential with which the user is to access the data. As an example, the credential is a token. The token is generated to be time-limited. For example, the token is temporary for valid for a predefined period of time. Upon expiration of the token, authentication of the token in connection with an attempt to access the data will be denied. In some embodiments, data access module 235 generates the token such as in response to determining to provide the user with access to data. In some embodiments, data access module 235 obtains the token such as from another module (e.g., in response to requesting the token).

In some embodiments, system 200 comprises cluster module 240. System 200 uses cluster module 240 to provide access to data via a cluster such as a secure cluster. Cluster module 240 can instantiate a cluster in response to the determination to provide access to the data via a cluster. For example, in response to data access module 235 determining to provide access to the data via instantiating a cluster and providing access to the data stored on the cluster. In some embodiments, cluster module 240 causes data that is to be provided via an instantiated cluster to be copied to the cluster from the data store (e.g., from the location at which the data is initially stored but to which system 200 determines not to provide the user with access. For example, cluster module 240 copies, to the cluster, data (i) for which the user (or user system or application) has permission to access, or (ii) for which the user has permission to access and that is responsive to the data request. In some embodiments, in connection with providing the data via a cluster, cluster module 240 creates on the cluster a table comprising the data for which the user has permission to access and that is responsive to the data request. Cluster module 240 provides to data locator module 235 a location on the cluster at which the data is to be accessed (e.g., by the user system).

In some embodiments, system 200 comprises data store access module 245. System 200 uses data store access module 245 to provide access to the data at a location on the data store. As an example, in response to system 200 determining to provide access to the data on the data store, data store access module 245 causes the data store to filter the data according to one or more of (i) the permissions for the user (or user system or application), or (ii) data that is responsive to the data request. For example, data store access module 245 causes (e.g., instructs) the data store to create a table or view comprising the data for which the user has permission to access (e.g., to read). As another example, data store access module 245 causes (e.g., instructs) the data store to create a table or view comprising data satisfying both of the following conditions: (i) data for which the user has permission to access, and (ii) data that is responsive to the data request. Data store access module 245 determines a location on the data store at which the data is to be accessed, and data store access module 245 provides to data locator module 235 a location on the data store at which the data is to be accessed (e.g., by the user system).

In some embodiments, system 200 comprises user interface module 250. System 200 uses user interface module 250 to provide information to a user system (e.g., a workspace, a notebook such as a user interface for code development, an interface for a web application, etc.). In some embodiments, user interface module 250 provides a credential and/or a location at which the data is to be accessed (e.g., a location at which the data is accessible such as in connection with use of a token for authentication). As an example, the credential and/or location as a selectable element (e.g., a hyperlink comprising the credential and/or the location). User interface module 250 can provide a workspace in a web user interface that is rendered at a user system (e.g., rendered in a web browser via which user system is accessing the system). User interface module 250 can further provide a user interface to administrator system 150 to enable an administrator to manage and/or configuring settings of system 200 or managed data service 110. In some embodiments, user interface module 250 provides a user interface for various other applications such as applications provided by a business application layer.

According to various embodiments, storage 215 comprises one or more of filesystem data 260, data store metadata 265, and/or permissions data 270. Storage 215 comprises a shared storage (e.g., a network storage system) and/or database data, and/or user activity data. In some embodiments, filesystem data 260 comprises a database such as one or more datasets (e.g., one or more datasets for one or more features, etc.). Filesystem data 260 comprises data such as a code being developed, code used in connection with development of a model, data generated in connection with executing code, modules imported into a workspace, etc. In some embodiments, filesystem data 260 comprises data pertaining to a cluster instantiated to provide data to a user. In some embodiments, data store metadata 265 comprises information pertaining to the data store and/or data stored on the data store. As an example, data store metadata 265 stores an index of data stored on the data store, location information indicating a location at which data is stored on the data store, etc. In some embodiments, permissions data 270 comprises information comprising one or more security policies, and/or permissions pertaining to data access for data on the data store. As an example, permissions data 270 stores a mapping of permissions such as a mapping of user identifiers for permitted users to data, a mapping of user identifiers for permitted users to types of data, a mapping of user identifiers for permitted users to locations of data (e.g., directories, tables, views, tenants, etc.), a mapping of groups of users to data, etc.

According to various embodiments, memory 220 comprises executing application data 275. Executing application data 275 comprises data obtained or used in connection with executing an application such as an application executing in connection with providing the access to data stored on the data store, an application that enforces security of data in the data store, an application that monitors data and operations of the data store, an application that executes code being developed in a workspace. In some embodiments, the application comprises one or more applications that perform one or more of receive and/or execute a query or command, generate a report and/or configure information that is responsive to an executed query or command, and/or to provide to a user information that is responsive to a query or command. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3:
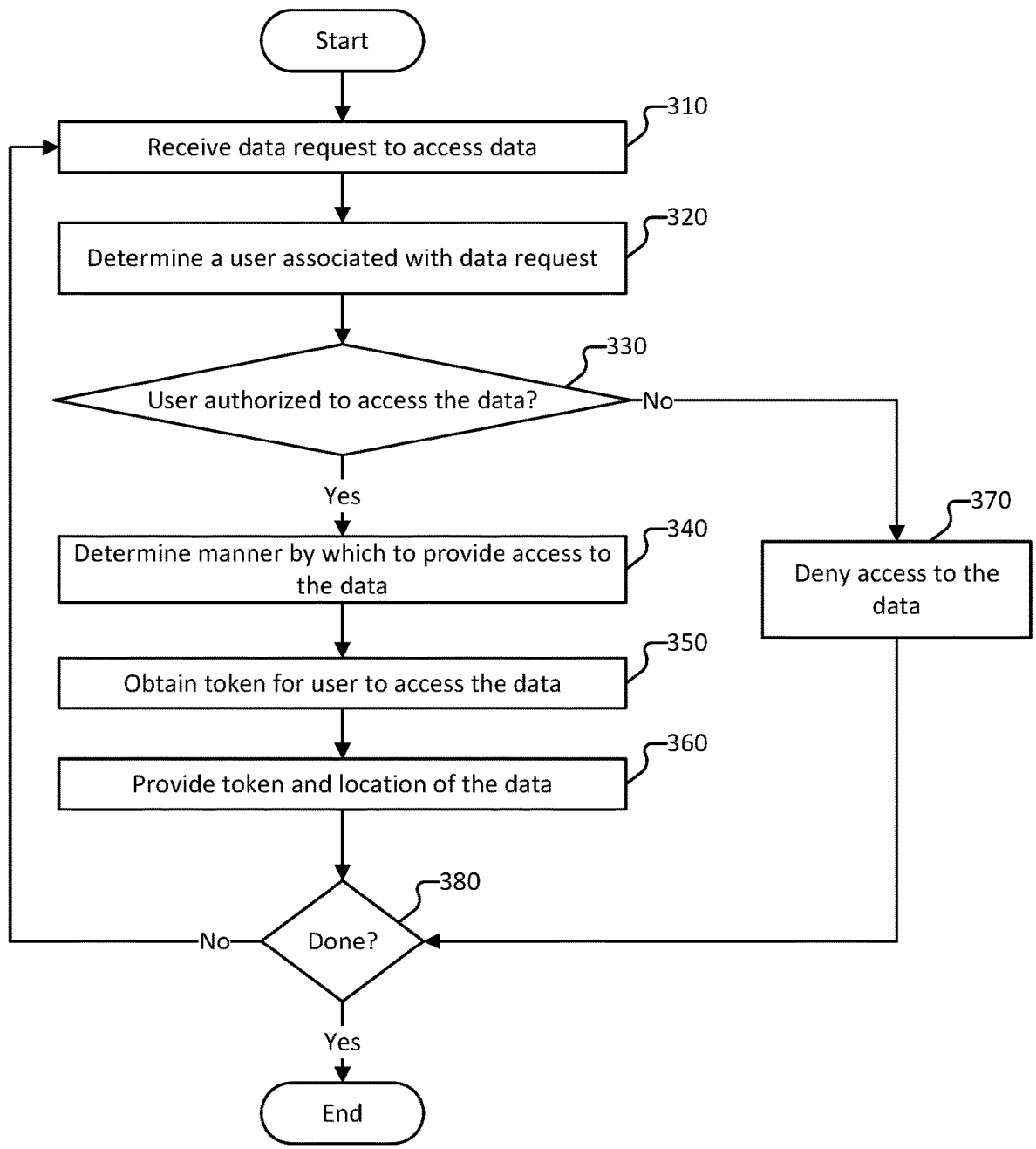
FIG. 3 is a flow diagram of a method for providing access to data stored in a system for data storage according to various embodiments of the present application.

FIG. 3 is a flow diagram of a method for providing access to data stored in a system for data storage according to various embodiments of the present application. According to various embodiments, process 300 is implemented at least in part by system 100 of FIG. 1 and/or system 200 of FIG. 2. In some embodiments, process 300 is implemented in connection with process 400 of FIG. 4, process 500 of FIG. 5, and/or process 600 of FIG. 6, At 310, a data request to access data is received. In some embodiments, the system receives the data request from a user such as via a user system. For example, in response to a user inputting a request to an interface (e.g., a web interface), the user system communicates the request to the system. In some embodiments, the managed data service (e.g., the metastore layer of the managed data service) intercepts the data request, or a control layer intercepts the data request and provides the request to the managed data service. The data corresponding to the data request is stored in a data store.

At 320, a user associated with the data request is determined. In response to receiving the data request, the system determines the user associated with the data request. For example, the system determines the user associated with the user system from which the data request is received. In some embodiments, the data request comprises information indicating a user (e.g., a user identifier, a user system identifier, etc.).

At 330, a determination of whether the user is authorized to access the data is performed. The system determines whether the user is authorized to access the data based on a permissions set associated with the user, the data corresponding to the data request, and/or the location at which the data is stored. In some embodiments, the stores (or has access to) a mapping of permissions such as a mapping of user identifiers for permitted users to data, a mapping of user identifiers for permitted users to types of data, a mapping of user identifiers for permitted users to locations of data (e.g., directories, tables, views, tenants, etc.), a mapping of groups of users to data, etc. As an example, the system uses a user identifier associated with a data request (e.g., included in the data request) to query the mapping of permissions in connection with determining whether the user is authorized to access the data corresponding to the data request.

In response to determining that the user is authorized to access the data at 330, process 300 proceeds to 340 at which a manner by which access to the data is to be provided. In some embodiments, the system determines whether to provide access to the data by (i) instantiating a cluster and providing access to the data stored on the cluster, or (ii) providing access to a location at which the data is stored on the system for data storage. For example, the system selects the manner by which to provide access to the data from (i) or (ii) above based at least in part on one or more of (a) a user system from which the data request to access data is received, (b), a user associated with the data request, (c) a type of data requested, (d) a context of the data request, (e) a determination that the user system from which the data request is received is not a managed or protected user system (e.g., that the user system is not a privilege-enforcing client), (f) an amount of memory that a user associated with a data request has permission to access, (g) an indication in the data request of the manner by which the data is to be accessed (e.g., via a secure cluster, or to system for data storage), etc. Examples of the context of the data request include a date, a time, a geographic region of the data (e.g., a data location), a location of the user system, a group membership, a quality associated with a user, applications being executed contemporaneous with the data request (e.g., executed on a server of the system, by the user system, etc.), other requests or other data obtained by the corresponding user or user system within a predetermined threshold period of time, etc.

In some embodiments, determining the manner by which the data is to be provided comprises determining a location at which the data is to be provided. For example, the system determines whether to provide the data on an instantiated cluster and a location on the instantiated cluster at which the data is to be accessed by the user. As another example, the system determines whether to provide the data on the data store on which the data is stored, and a location of the data store at which the data is to be accessed by the user (e.g., a table or view can be created specifically to provide the data to the user in response to the data request).

At 350, a token to be used in connection with accessing the data is obtained. In some embodiments, the system obtains the token based at least in part on one or more of the user associated with the data request (e.g., the user for whom the token is being provided), a location of the data, a system on which the location to be provided is stored (e.g., an instantiated secure cluster, the data store, etc.), etc. As an example, the system generates the token in response to determining that the user is authorized to access the data. As another example, the system requests that a credential system or an authentication system generates the token (e.g., based on parameters provided by the system such as comprised in the request for the token). In some embodiments, the token is time-limited (e.g., temporary, expires after a predetermined or preset amount of time, at a preset time, etc.), user-allowable-action-limited (e.g., the token is limited in what it allows the user to do—for example, it may allow modifying the existing data, adding new data, reading data, etc.), scope-limited (e.g., the credential is valid only with respect to a certain set of data such as data corresponding to the user access permissions, etc.), and/or action-limited (e.g., in response to an action or when thing X happens and causes the token to expire—for example, X=logging out, being removed from a group, the underlying data has changed, new data being added to the table, a permission being revoked or modified, an ownership being changed, other users being given write tokens to the data, etc.).

At 360, the token and a location of the data is provided. In some embodiments, the system sends the token and the location of the data to the user (e.g., the user system). The token and/or the location may be comprised in a URL or a URI. In some embodiments, in response to receiving the token, the user system can access the data directly (e.g., without further mediation from the metastore at least with respect to such data and/or for such length of time that the token remains valid).

In response to determining that the user is not authorized to access the data at 330, process 300 proceeds to 370 at which access to the data is denied. In some embodiments, denying access comprises providing a notice to a user system. As an example, the notice indicates that the user does not have permission to access the data corresponding to the data request. The notice can be provided on a user interface at the user system (e.g., a web interface via which the user system communicates with managed data service, the data store, etc.).

At 370, a determination is made as to whether process 300 is complete. In some embodiments, process 300 is determined to be complete in response to a determination that no further commands are to be performed or that no further data is to be accessed, a user has indicated that no further data is to be accessed, the user has exited the system, an administrator indicates that process 300 is to be paused or stopped, a determination that a fault occurred at the data store or in execution of code via the workspace, etc. In response to a determination that process 300 is complete, process 300 ends. In response to a determination that process 300 is not complete, process 300 returns to 310.

Figure 4:
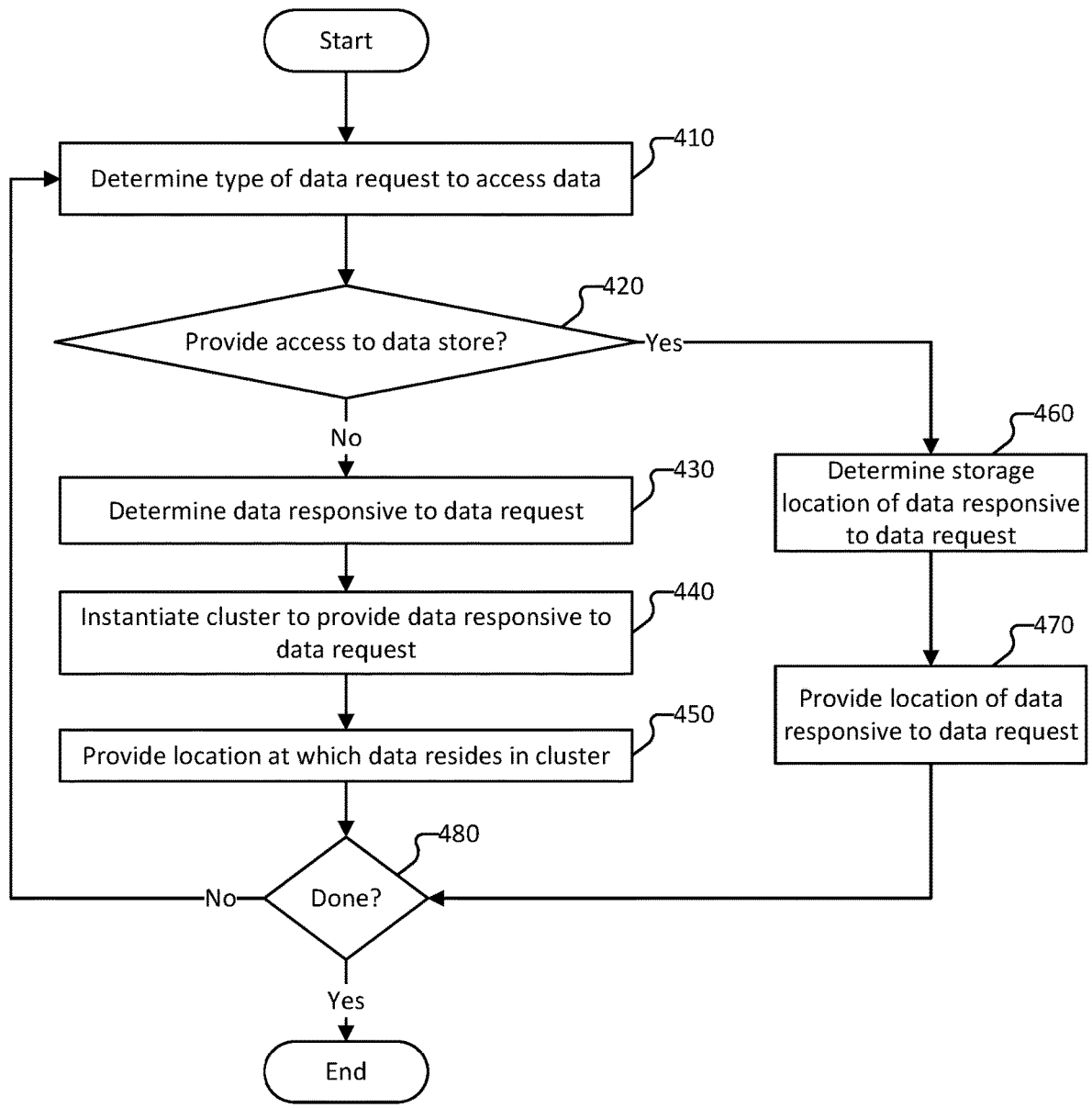
FIG. 4 is a flow diagram of a method for providing access to data stored in a system for data storage according to various embodiments of the present application.

FIG. 4 is a flow diagram of a method for providing access to data stored in a system for data storage according to various embodiments of the present application. According to various embodiments, process 400 is implemented at least in part by system 100 of FIG. 1 and/or system 200 of FIG. 2. In some embodiments, process 400 is implemented in connection with process 300 of FIG. 3, process 500 of FIG. 5, and/or process 600 of FIG. 6.

At 410, a type of data request to access data is determined. In some embodiments, the data request comprises an indication of whether the data is to be provided via a secure cluster (e.g., an instantiated cluster) or at a location on the data store. For example, creating a table or view pertaining to information that the user is authorized to access may take significantly longer on a data store than on an instantiated cluster, thus the user may determine to request that the responsive data be provided via an instantiated cluster. As another example, if a system deems a user or user system to be insecure, the data request may also be deemed insecure and thus be used in connection with determining to provide the data via an instantiated cluster. In some embodiments, the system determines the type of data request based on whether all or some of the data responsive to the data request is comprised in the data store.

At 420, a determination of whether to provide access to the data store is performed. In some embodiments, the system determines to provide data responsive to the data request based at least in part on a type of data request. For example, if the data request does not comprise an indication of a request for the data to be provided via an instantiated cluster, or if the data request comprises an indication that the providing the data on the data store is being requested, the system determines whether to provide the data via access to the data store based at least in part on the indication(s).

In some embodiments, if the system determines that the data responsive to the data request is not all within the data store (e.g., that data from another data source is to be obtained in connection with providing a response to the data request), the system determines not to provide access to the data store. For example, the system determines to instantiate a cluster, and copy to the cluster pertinent data from the data store, and pertinent data from one or more other data sources that comprise information used to respond to the data request.

In response to determining not to provide access to the data store at 420, process 400 proceeds to 430 at which data responsive to the data request is determined. In some embodiments, 430 is provided before 420 and the determination of whether to provide access to the data store comprises determining whether to provide access to the specific data that is responsive to the data request.

At 440, a cluster is instantiated to provide data responsive to the data request. In some embodiments, the system determines one or more configurations for the cluster. For example, the one or more configurations are determined based on at least in part on one or more of (i) a user associated with the data request, (ii) a quality of service associated with the user or a customer with which the user is affiliated, (iii) a size of the data that is responsive to the data request, (iv) one or more security policies pertaining to the data, the user, or the user system, etc.

At 450, the location at which data resides in the cluster is provided. In some embodiments, the system sends the location of the data in the cluster to the user (e.g., the user system). For example, the system provides to the user a location of a table or view created in response to the data request (e.g., a table or view created in response to a request sent by the system to the cluster, etc.). The location of the data can be provided via a selectable element such as a hyperlink to a URL or a URI. In some embodiments, the location is provided contemporaneously with a token (e.g., a temporary token). The token and/or the location may be comprised in a URL or URI. In some embodiments, in response to receiving the token, the user system can access the data directly (e.g., without further mediation from the metastore at least with respect to such data and/or for such length of time that the token remains valid).

In response to determining to provide access to the data store at 420, process 400 proceeds to 460 at which a storage location of data responsive to the data request is determined. In some embodiments, the system determines where on the data store the data responsive to the data request is stored. For example, the system queries an index pertaining to a mapping of data to locations of data in the data store. As another example, the system queries the data store for an indication of the location at which the data is stored. As another example, the system requests the data store to create a table or view comprising the data corresponding to the data request, and the system determines (e.g., receives) the location of such data (e.g., of the table or view).

At 470, location of data responsive to the data request provided. In some embodiments, the system sends the location of the data on the data storage to the user (e.g., the user system). For example, the system provides to the user a location of a table or view created in response to the data request (e.g., a table or view created in response to a request sent by the system to the data store, etc.). The location of the data can be provided via a selectable element such as a hyperlink to a URL or a URI. In some embodiments, the location is provided contemporaneously with a token (e.g., a temporary token). The token and/or the location may be comprised in a URL or a URI. In some embodiments, in response to receiving the token, the user system can access the data directly (e.g., without further mediation from the metastore at least with respect to such data and/or for such length of time that the token remains valid). The location at which the data is provided can correspond to a filtered subset of data corresponding to data that is responsive to the data request (e.g., the subset of data can be filtered from a set of data from stored data in the data store and/or a set of data for which the user has access permissions).

At 480, a determination is made as to whether process 400 is complete. In some embodiments, process 400 is determined to be complete in response to a determination that no further commands are to be performed or that no further data is to be accessed, a user has indicated that no further data is to be accessed, the user has exited the system, an administrator indicates that process 400 is to be paused or stopped, a determination that a fault occurred at the data store or in execution of code via the workspace, etc. In response to a determination that process 400 is complete, process 400 ends. In response to a determination that process 400 is not complete, process 400 returns to 410.

Figure 5:
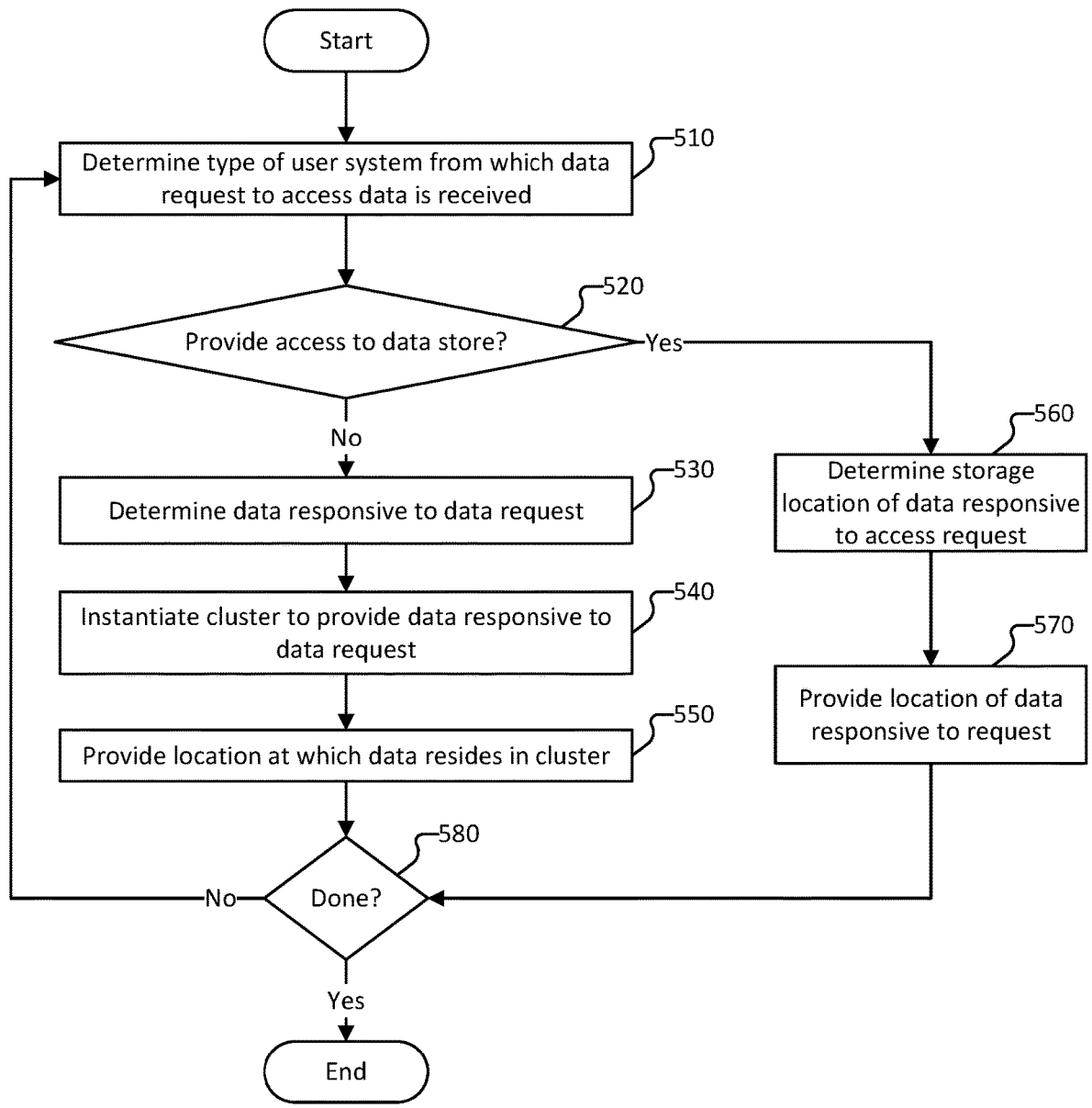
FIG. 5 is a flow diagram of a method for providing access to data stored in a system for data storage according to various embodiments of the present application.

FIG. 5 is a flow diagram of a method for providing access to data stored in a system for data storage according to various embodiments of the present application. According to various embodiments, process 500 is implemented at least in part by system 100 of FIG. 1 and/or system 200 of FIG. 2. In some embodiments, process 500 is implemented in connection with process 300 of FIG. 3, process 400 of FIG. 4, and/or process 600 of FIG. 6.

At 510, a type of user system from which a data request for accessing data is received. In some embodiments, the system determines whether the data request is received from a privilege-enforcing user system. As an example, a privilege-enforcing client may be a device that is managed by an organization (e.g., a customer that owns the data of the data stored on the system for data storage) such as in a manner that enforces one or more security policies for the organization or for particular types of information. A device that is managed may include a device that is subject to an organization's deployment of a unified endpoint and enterprise mobility management for mobile devices. According to various embodiments, in response to determining that the system from which the data request is received is not a privilege-enforcing client, the system determines to provide access to the data via instantiating a cluster, copying the data to the cluster, and providing access to the data stored on the cluster. In some embodiments, depending on the data and the access restrictions defined around it, a user is given direct access to the data (e.g., a user requests access to an entire table, a user has permission to an entire table, and is granted access to the entire table, etc.).

At 520, a determination of whether to provide access to the data store is performed. The system determines whether to provide access to the data store based at least in part on the type of user system from which the data request is received. As an example, the system determines whether the user system is deemed secure. For example, the system determines whether the user system is configured to enforce security (e.g., at least with respect to the data responsive to the data request) locally at the user system. The system can determine whether to provide access to the data store based at least in part on whether the user system is secure. For example, if the user system is deemed insecure, the system determines to provide access to the data via an instantiated cluster, and if the system is deemed secure, the system determines to provide access to the data via the data store.

In some embodiments, the system distinguishes between clients that enforce the access control model and those that do not. For trusted clients, full access and instructions on how and what data to return to the user. For untrusted clients, there are two ways to mediate access: 1) using a cluster or other computing base to do the data filtering and write the data back out to the data storage; The location is then returned to the client requesting the data access as if it were simplu the raw data. the client does not need to know that the data was filtered or not filtered; and 2) the cluster is used to perform the filtering and the filtered results are streamed the back over the network.

According to various embodiments, in response to determining that the system from which the data request is received is not a privilege-enforcing client, the system determines to provide access to the data via instantiating a cluster, copying the data to the cluster, and providing access to the data stored on the cluster.

In response to determining not to provide access to the data store at 520, process 500 proceeds to 530 at which data responsive to the data request is determined. In some embodiments, 530 corresponds to, or is similar to, 430 of process 400 of FIG. 4.

At 540, a cluster is instantiated to provide data responsive to the data request. In some embodiments, 540 corresponds to, or is similar to, 440 of process 400 of FIG. 4.

At 550, the location at which data resides in the cluster is provided. In some embodiments, 550 corresponds to, or is similar to, 450 of process 400 of FIG. 4.

In response to determining to provide access to the data store at 520, process 500 proceeds to 560 at which a storage location of data responsive to the data request is determined. In some embodiments, 560 corresponds to, or is similar to, 460 of process 400 of FIG. 4.

At 570, location of data responsive to the data request provided. In some embodiments, 570 corresponds to, or is similar to, 470 of process 400 of FIG. 4.

At 580, a determination is made as to whether process 500 is complete. In some embodiments, process 500 is determined to be complete in response to a determination that no further commands are to be performed or that no further data is to be accessed, a user has indicated that no further data is to be accessed, the user has exited the system, an administrator indicates that process 500 is to be paused or stopped, a determination that a fault occurred at the data store or in execution of code via the workspace, etc. In response to a determination that process 500 is complete, process 500 ends. In response to a determination that process 500 is not complete, process 500 returns to 510. In some embodiments, a user does not access at all, and in that case the system will return an error indicating that the user does not have access rights.

Figure 6:
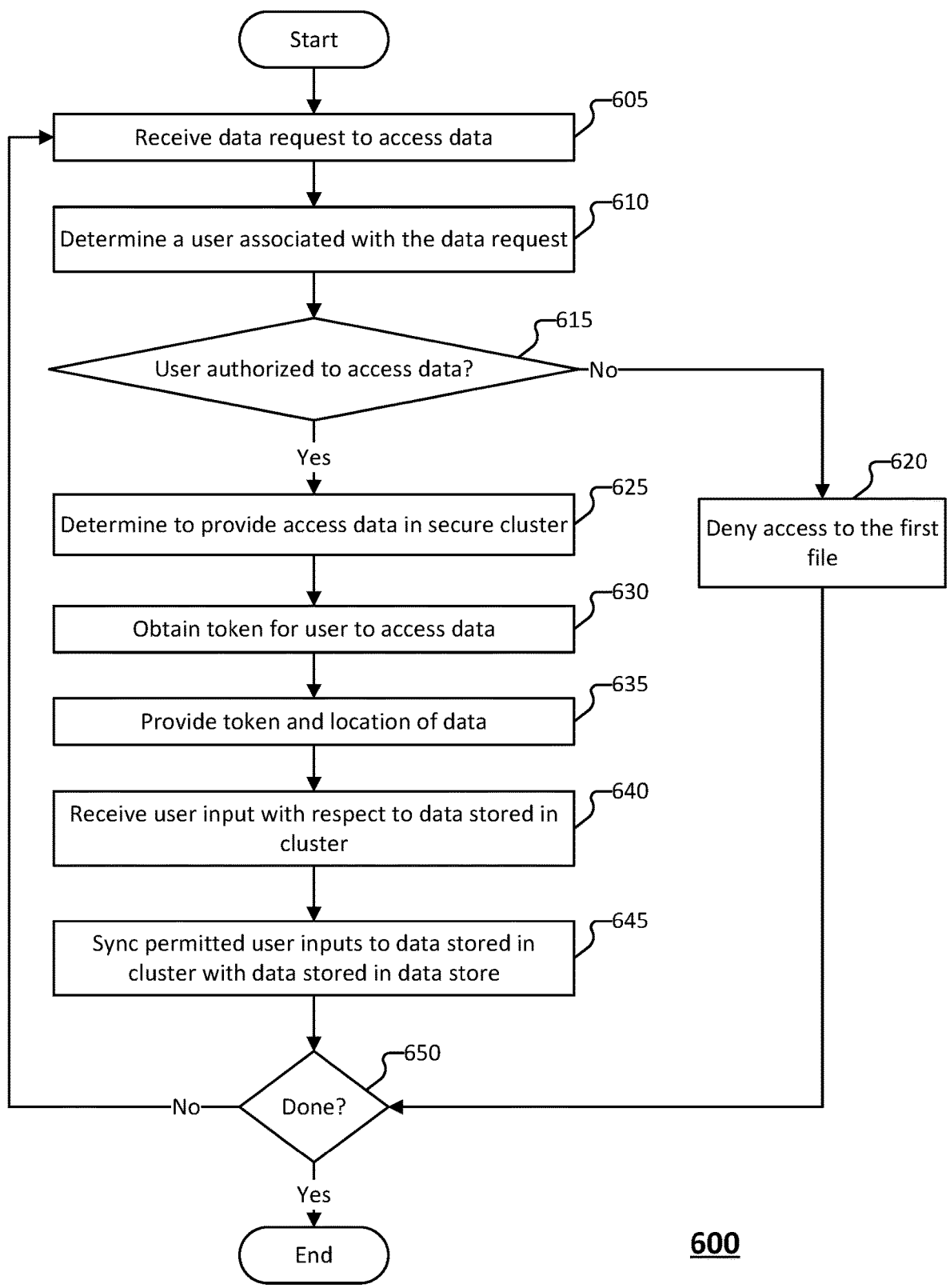
FIG. 6 is a flow diagram of a method for providing access to data stored in a system for data storage according to various embodiments of the present application.

FIG. 6 is a flow diagram of a method for providing access to data stored in a system for data storage according to various embodiments of the present application. According to various embodiments, process 600 is implemented at least in part by system 100 of FIG. 1 and/or system 200 of FIG. 2. In some embodiments, process 600 is implemented in connection with process 300 of FIG. 3, process 400 of FIG. 4, and/or process 500 of FIG. 5.

At 605, a data request to access data is received. In some embodiments, the system receives the data request from a user such as via a user system. For example, in response to a user inputting a request to an interface (e.g., a web interface), the user system communicates the request to the system. In some embodiments, the managed data service (e.g., the metastore layer of the managed data service) intercepts the data request, or a control layer intercepts the data request and provides the request to the managed data service. The data corresponding to the data request is stored in a data store.

At 610, a user associated with the data request is determined. In response to receiving the data request, the system determines the user associated with the data request. For example, the system determines the user associated with the user system from which the data request is received. In some embodiments, the data request comprises information indicating a user (e.g., a user identifier, a user system identifier, etc.).

At 615, a determination of whether the user is authorized to access the data is performed. The system determines whether the user is authorized to access the data based on a permissions set associated with the user, the data corresponding to the data request, and/or the location at which the data is stored. In some embodiments, the stores (or has access to) a mapping of permissions such as a mapping of user identifiers for permitted users to data, a mapping of user identifiers for permitted users to types of data, a mapping of user identifiers for permitted users to locations of data (e.g., directories, tables, views, tenants, etc.), a mapping of groups of users to data, etc. As an example, the system uses a user identifier associated with a data request (e.g., included in the data request) to query the mapping of permissions in connection with determining whether the user is authorized to access the data corresponding to the data request.

In response to determining that the user is not authorized to access the data at 615, process 600 proceeds to 620 at which access to the data is denied. In some embodiments, denying access comprises providing a notice to a user system. As an example, the notice indicates that the user does not have permission to access the data corresponding to the data request. The notice can be provided on a user interface at the user system (e.g., a web interface via which the user system communicates with managed data service, the data store, etc.).

In response to determining that the user is authorized to access the data at 615, process 600 proceeds to 625 at which the data is determined to be provided via a secure cluster.

At 630, a token is obtained for the user to access the data. In some embodiments, the system obtains the token based at least in part on one or more of the user associated with the data request (e.g., the user for whom the token is being provided), a location of the data, a system on which the location to be provided is stored (e.g., an instantiated secure cluster, the data store, etc.), etc. As an example, the system generates the token in response to determining that the user is authorized to access the data. As another example, the system requests that a credential system or an authentication system generates the token (e.g., based on parameters provided by the system such as comprised in the request for the token). In some embodiments, the token is time-limited (e.g., temporary, expires after a predetermined amount of time), and/or scope-limited (e.g., the credential is valid only with respect to a certain set of data such as data corresponding to the user access permissions, etc.).

At 635, the token and location of the data is provided. In some embodiments, the system sends the token and the location of the data to the user (e.g., the user system). The token and/or the location may be comprised in a URL or a URI. In some embodiments, in response to receiving the token, the user system can access the data directly (e.g., without further mediation from the metastore at least with respect to such data and/or for such length of time that the token remains valid). The token and the location of the data can be provided via a web interface displayed at the user system.

At 640, user input with respect to data stored in the cluster is received. In some embodiments, the system receives (or intercepts) a user input to data stored in the cluster. For example, the user inputs (via an interface on the user system) a modification to data in a table on the cluster. In some embodiments, the system mediates permitted user inputs based at least in part on the token with which the user accessed the data in the cluster, and/or a user corresponding to the user input.

At 645, permitted user inputs to data stored in the cluster is synced with data stored in the data store. In some embodiments, the system syncs data provided to the user via the cluster with data stored in the data store. If a user modifies the data in the cluster an inconsistency is created between the data stored in the cluster and the data in the data store (e.g., from which the data in cluster was initially copied). Similarly, data in the data store may have been modified (e.g., by other users) since the cluster was instantiated and a copy of the data in the data store was written to the cluster. Accordingly, the system can sync the modifications across the cluster and the data store, or at least sync modifications made at the cluster with a current copy stored at the data store. Modifications to data in the cluster may be committed at the data store based at least in part on one or more conflict resolution policies.

At 650, a determination is made as to whether process 600 is complete. In some embodiments, process 600 is determined to be complete in response to a determination that no further commands are to be performed or that no further data is to be accessed, a user has indicated that no further data is to be accessed, the user has exited the system, an administrator indicates that process 600 is to be paused or stopped, a determination that a fault occurred at the data store or in execution of code via the workspace, etc. In response to a determination that process 600 is complete, process 600 ends. In response to a determination that process 600 is not complete, process 600 returns to 605.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors; and
a memory, coupled with the one or more processors, the memory comprising stored instructions executable by the one or more processors, the instructions when executed causes the one or more processors to:
receive a data request from a user;
determine data corresponding to the data request;
determine whether the user has requisite permissions to access the data; and
in response to a determination that the user has requisite permissions to access the data:
determine, based on an identity of the user, a manner by which to provide access to the data, wherein the data comprises a filtered subset of stored data, wherein the determination of the manner by which to provide access to the data further comprises instructions to determine whether to provide the data via a secure cluster or to provide data by providing access to a location at which the data is stored, wherein the secure cluster is a set of connected nodes;
in response to a determination to provide data via a secure cluster, instantiating a secure cluster;
copying the filtered subset of stored data from the location at which the data is stored to the instantiated secure cluster, wherein the filtered subset of stored data copied to the instantiated secure cluster may only be accessible to the user; and
generate a token based at least in part on the user and the instantiated secure cluster.

2. The system of claim 1, wherein the filtered subset of the stored data is stored in a new structure, a file, or table.

3. The system of claim 2, wherein the token enables access to an entity stored on the secure cluster.

4. The system of claim 3, wherein the filtered subset of the stored data is transferred from a storage system without selective access control.

5. The system of claim 1, further comprising:
in response to determining to provide data by providing access to a location at which the data is stored, providing a path to the location at which the data is stored.

6. The system of claim 1, wherein:
a storage system storing the stored data allows only access to the filtered subset of the stored data based on the token;
the storage system constitutes certain data responsive to the data request; and
in response to receiving a request in connection with the token, the storage system permits access associated with the request to only a table that has been constituted.

7. The system of claim 6, wherein the certain data is constituted based on permissions associated with the user.

8. The system of claim 1, wherein:
the stored data is stored on a system for data storage; and
user requests to access data comprised in the system for data storage are mediated by a metastore layer.

9. The system of claim 8, wherein the metastore layer stores an index of information comprised in the stored data.

10. The system of claim 8, wherein the metastore layer stores metadata associated with information comprised in the stored data.

11. The system of claim 8, wherein the metastore layer stores permissions for one or more users with respect to information comprised in the stored data.

12. The system of claim 1, wherein an extent of a permission that the token provides with respect to the stored data is defined based on the data request.

13. The system of claim 1, wherein the token expires after a preset period of time, at a preset time, or in response to an action.

14. The system of claim 1, wherein the one or more processors are further configured to provide to the user the token with which the user is to access data responsive to the data request.

15. A method, comprising:
receiving, by one or more processors, a data request from a user;
determining data corresponding to the data request;
determining whether the user has requisite permissions to access the data; and
in response to determining that the user has requisite permissions to access the data:
  determining, based on an identity of the user, a manner by which to provide access to the data, wherein the data comprises a filtered subset of stored data, wherein determining the manner by which to provide access to the data further comprises determining whether to provide the data via a secure cluster or to provide data by providing access to a location at which the data is stored, wherein the secure cluster is a set of connected nodes;
  in response to determining to provide data via a secure cluster, instantiating a secure cluster;
  copying the filtered subset of stored data from the location at which the data is stored to the instantiated secure cluster, wherein the filtered subset of stored data copied to the instantiated secure cluster may only be accessible to the user; and
  a token based at least in part on the user and the instantiated secure cluster.

16. The method of claim 15, the filtered subset of the stored data is stored in a new structure, a file, or table.

17. The method of claim 15, wherein the token enables access to an entity stored on the secure cluster.

18. A computer program product embodied in a non-transitory computer readable medium and comprising computer instructions for:
receiving, by one or more processors, a data request from a user;
determining data corresponding to the data request;
determining whether the user has requisite permissions to access the data; and
in response to determining that the user has requisite permissions to access the data:
  determining, based on an identity of the user, a manner by which to provide access to the data, wherein the data comprises a filtered subset of stored data, wherein determining the manner by which to provide access to the data further comprises determining whether to provide the data via a secure cluster or to provide data by providing access to a location at which the data is stored, wherein the secure cluster is a set of connected nodes;
  in response to determining to provide data via a secure cluster, instantiating a secure cluster;
  copying the filtered subset of stored data from the location at which the data is stored to the instantiated secure cluster, wherein the filtered subset of stored data copied to the instantiated secure cluster may only be accessible to the user; and
  generating a token based at least in part on the user and the instantiated secure cluster.

19. The computer program product embodied in the non-transitory computer readable medium of claim 18, the filtered subset of the stored data is stored in a new structure, a file, or table.

20. The computer program product embodied in the non-transitory computer readable medium of claim 18, wherein the token enables access to an entity stored on the secure cluster.

* * * * *

UNITED STATES PATENT AND TRADEMARK OFFICE
CERTIFICATE OF CORRECTION

PATENT NO. : 12,277,237 B2
APPLICATION NO. : 17/514982
DATED : April 15, 2025
INVENTOR(S) : Zaharia et al.

Page 1 of 1

It is certified that error appears in the above-identified patent and that said Letters Patent is hereby corrected as shown below:

In the Claims

In Column 24, in Claim 3, Line 49, delete "claim 2," and insert -- claim 1, --, therefor.

In Column 24, in Claim 4, Line 51, delete "claim 3," and insert -- claim 1, --, therefor.

Signed and Sealed this
Twenty-second Day of July, 2025

Coke Morgan Stewart
*Acting Director of the United States Patent and Trademark Office*